(12) United States Patent
Salama et al.

(10) Patent No.: US 8,440,080 B2
(45) Date of Patent: May 14, 2013

(54) PORTABLE OZONE GENERATOR AND USE THEREOF FOR PURIFYING WATER

(75) Inventors: Amir Salama, Shefford (CA); Marianne Salama, Shefford (CA)

(73) Assignee: Ozomax Inc., Shefford, Quebec (CA)

( * ) Notice: Subject to any disclaimer, the term of this patent is extended or adjusted under 35 U.S.C. 154(b) by 0 days.

(21) Appl. No.: 12/272,487

(22) Filed: Nov. 17, 2008

(65) Prior Publication Data
US 2009/0114605 A1 May 7, 2009

Related U.S. Application Data

(63) Continuation of application No. PCT/CA2007/000734, filed on Apr. 30, 2007.

(30) Foreign Application Priority Data

May 17, 2006 (CA) ..................................... 2547183

(51) Int. Cl.
*C02F 1/50* (2006.01)
*C02F 1/78* (2006.01)

(52) U.S. Cl.
USPC ............. 210/243; 210/748.01; 210/748.16; 210/192; 210/760; 210/600; 205/43; 205/682; 205/742; 205/755; 205/758; 422/186; 422/186.06; 422/22; 204/155; 204/156; 204/157.15

(58) Field of Classification Search ............. 210/749, 210/673, 760, 600, 748.01, 748.16, 748.17, 210/758, 794, 243; 29/846, 847; 205/126, 205/43, 682, 742, 755, 758, 759; 422/22, 422/23, 28, 29, 186, 186.04, 186.07, 186.18; 204/155, 156, 157.15, 164, 176, 554, 193, 204/194, 280, 284, 298.13
See application file for complete search history.

(56) References Cited

U.S. PATENT DOCUMENTS 2,052,962 A * 9/1936 Booe .............................. 205/657
3,623,970 A 11/1971 Haas
(Continued)

FOREIGN PATENT DOCUMENTS

EP 1090880 4/2001
JP 60077357 A * 5/1985
(Continued)

OTHER PUBLICATIONS

F. Huet et al, "Oxygen evolution on electrodes of different roughness: an electrochemical noise study", J Solid State Electrochem (2004) 8: 786-793.
(Continued)

*Primary Examiner* — Joseph Drodge
*Assistant Examiner* — Cameron J Allen
(74) *Attorney, Agent, or Firm* — Eric Fincham

(57) ABSTRACT

The present invention relates to a portable device for generating ozone in water, purifying the water and making it drinkable. The device comprises a housing; at least two electrodes, including an anode and a cathode extending from the housing into the water and each having semi-rough or rough surfaces in contact with the water. The device also comprises a power supply operatively connected to the electrodes for generating between them a difference of potential creating a current and the hydrolysis of the water creating ozone that purifies the water. The electrodes may have a plate or a rode and tube configuration with a plurality of holes with rough edges. The roughness of the surfaces and of the edges of the holes leads to a coalescence of tiny hydrogen bubbles into larger hydrogen bubbles. The hydrogen may be also removed by absorption in a conductive material and regenerated for reuse.

10 Claims, 12 Drawing Sheets

U.S. PATENT DOCUMENTS

| | | | |
|---|---|---|---|
| 4,003,832 A * | 1/1977 | Henderson et al. | 210/728 |
| 4,061,558 A * | 12/1977 | Saito et al. | 204/290.12 |
| 4,189,363 A | 2/1980 | Beitzel | |
| 4,316,787 A * | 2/1982 | Themy | 204/229.5 |
| 4,379,043 A * | 4/1983 | Chappelle | 204/228.5 |
| 4,411,756 A | 10/1983 | Bennett et al. | |
| 4,414,071 A | 11/1983 | Cameron et al. | |
| 4,416,747 A | 11/1983 | Menth et al. | |
| 4,555,317 A | 11/1985 | Nicolas et al. | |
| 4,728,441 A | 3/1988 | King | |
| 4,992,169 A | 2/1991 | Izumiya | |
| 5,151,252 A | 9/1992 | Mass | |
| 5,154,895 A * | 10/1992 | Moon | 422/186.07 |
| 5,203,972 A | 4/1993 | Shimamune et al. | |
| 5,205,994 A | 4/1993 | Sawamoto et al. | |
| 5,250,177 A | 10/1993 | Cho | |
| 5,266,215 A | 11/1993 | Engelhard | |
| 5,507,932 A * | 4/1996 | Robinson | 204/230.2 |
| 5,529,683 A * | 6/1996 | Critz et al. | 205/350 |
| 5,599,438 A * | 2/1997 | Shiramizu et al. | 205/746 |
| 5,662,789 A | 9/1997 | MacDougall et al. | |
| 5,686,051 A | 11/1997 | Shiota et al. | |
| 5,762,779 A | 6/1998 | Shiramizu | |
| 5,779,865 A | 7/1998 | Schulze et al. | |
| 5,961,806 A * | 10/1999 | Tatsuura et al. | 205/127 |
| 6,022,456 A * | 2/2000 | Manning | 204/176 |
| 6,039,816 A * | 3/2000 | Morita et al. | 134/19 |
| 6,180,014 B1 | 1/2001 | Salama | |
| 6,188,097 B1 | 2/2001 | Derderian et al. | |
| 6,210,643 B1 | 4/2001 | Shiota | |
| 2003/0035764 A1 * | 2/2003 | Thomas et al. | 422/186.07 |
| 2003/0121798 A1 * | 7/2003 | Iseki et al. | 205/744 |
| 2003/0141181 A1 * | 7/2003 | Matsuzaki | 204/164 |
| 2003/0164308 A1 * | 9/2003 | Schlager et al. | 205/701 |
| 2004/0011665 A1 | 1/2004 | Koizumi et al. | |
| 2004/0226881 A1 * | 11/2004 | Miyazaki et al. | 210/615 |
| 2005/0023227 A1 | 2/2005 | Rychen et al. | |
| 2005/0109613 A1 | 5/2005 | Koizumi et al. | |
| 2005/0138804 A1 * | 6/2005 | Hasegawa et al. | 29/847 |
| 2005/0183964 A1 * | 8/2005 | Roberts et al. | 205/701 |
| 2007/0029190 A1 | 2/2007 | Hosonuma et al. | |

FOREIGN PATENT DOCUMENTS

| | | | |
|---|---|---|---|
| JP | 63176488 A * | 7/1988 | |
| JP | 2004298849 A * | 10/2004 | |
| RU | 1428707 | 10/1998 | |
| WO | WO 2005/054545 | 6/2005 | |
| WO | 2007131324 | 11/2007 | |

OTHER PUBLICATIONS

Andrew W. Phelps, "Diamond Films", John Wiley & Sons (2002), Myer Kutz Handbook of Materials Selection (p. 1295), ISBN:978-0-471-35924-1.

A. W. Phelps, Diamond Films, John Wiley & Sons (2002), Myer Kutz Handbook of Materials Selection p. 1295, ISBN 978-0-471-35924-1.

International Search Report, mailed May 15, 2007.

Innovatec Gerätetechnik GmbH: "O3ZONE-PEN"; product description published on Internet, Sep. 2005.

Innovatec Gerätetechnik GmbH: "WATER-PEN"; product description published on Internet, Sep. 2005.

Office Action dated Jun. 28, 2010 from Chinese Patent Office.

EPO—Supplementary European Search Report—EP 07719659—(EPO Form 1503 03.82)—May 26, 2010—5 pages.

* cited by examiner

PORTABLE OZONE GENERATOR AND USE THEREOF FOR PURIFYING WATER

PRIORITY

This application is a continuation of PCT/CA2007/000734 filed Apr. 30, 2007 which claims priority to CA 2,547,183 filed in Canada on May 17, 2006, the entire contents of which are incorporated by reference herein in their entireties.

FIELD OF THE INVENTION

The present invention relates to a portable device for generating ozone in situ in water in order to remove therefrom a large variety of pollutants, especially organic pollutants, in addition to bacteria and viruses, and thus make the water drinkable.

In other words, the present invention relates to a water purifier which can work with a low voltage power supply and thus be easily portable. Furthermore, the purifier can be manufactured with a size adapted to its purpose, that is, the same principles of design may be applied to large water treatment applications. For example, the purifier can be as small as a pen and be directly plunged into a glass of water. The purifier can also be adapted to be fixed at any kind of tap. Also, several devices may be installed in one or a series of large tanks to purify water.

The invention is not limited to the purification of water, but may pertain to any sort of liquid solutions containing water such as fruit juice, milk or dairy liquids, tea, coffer, or the like.

DESCRIPTION OF THE PRIOR ART

In order to carry out purification of water without the use of biocides such as chlorine and other chemicals, it is well known in the art to use ozone ($O_3$) as a disinfectant. Ozone is usually prepared outside the medium (water) and then injected inside the water by means of injectors or bubbling in a contact column. Such makes the process bulky and costly as it involves the use of several devices.

Production of ozone ($O_3$) by electrolysis is a well known process since the 19$^{th}$ century. By way of example, U.S. Pat. Nos. 5,250,177 and 5,154,895 disclose devices for generating ozone by electrolysis. The so generated ozone is then used for the purification of water. U.S. Pat. No. 4,728,441 discloses a device wherein ozone is produced from oxygen generated by electrolysis. However, the so generated ozone is recovered and used outside of the device. U.S. Pat. Nos. 4,416,747; 5,205,994; 5,686,051; 5,203,972 and 5,779,865 disclose devices using solid electrolyte to produce ozone. U.S. Pat. No. 3,623,970 discloses a device for producing a stream of ozone by electrolysis of water and conversion of the oxygen that is so produced into ozone.

It is further known in the art that ozone can be produced via UV light, such as in U.S. Pat. No. 4,189,363 (BEITZEL) and U.S. Pat. No. 4,992,169 (IZUMIYA).

It is further known that the efficiency of an apparatus using U.V. light to destroy micro-organisms can be enhanced if ozone is mixed with the water to be purified, such as in U.S. Pat. No. 5,266,215 (ENGELHARD).

In U.S. Pat. No. 5,151,252 (MASS), there is disclosed a photochemical reactor for the treatment of a fluid polluted with photoreactants components. This patent discloses that the walls of the reactor in the treatment region may be coated with a catalyst in order to increase the rate of secondary reactions that occur with reaction products produced by the initial photochemical reaction.

Salt bridges with membranes were used to separate the ozone, oxygen and mixed oxidants produced around the anode from the hydrogen produced at the cathode. Platinum (Pt) wires were used as the anode and as the cathode. The idea of membrane separation was also described and improved upon by the present inventor in U.S. Pat. No. 6,180,014 (SALAMA) wherein relatively higher voltages were used to get sufficient ozone production than the new inventive device described hereafter.

Nevertheless, water purification systems are large devises, uneasy to carry, to install and travel with.

It would therefore be a significant advance in the art of water purification system to provide a portable water purification system, working with a low voltage power supply by keeping the same purification efficiency and usable for purifying the water of a glass within a few second of time or fixing it at a tap anywhere you travel.

SUMMARY OF THE INVENTION

The object of the present invention is based on the discovery that the size of the hydrogen bubbles produced during the electrolysis strongly influences the final amount of ozone. The bigger are the bubbles, the smaller is the effective surface of the bubbles leading to a higher amount of ozone produced in situ. This results in a more efficient purification of the water.

Indeed, as it is well known in the art, the electrolysis of water leads to the creation of hydrogen gas ($H_2$) at the cathodes (negative poles), and oxidants at the anodes (positive poles). In an electrolytic cell, the anode is the positive terminal, which receives current from an external generator, whereas the cathode is the negative terminal.

The oxidants include ozone gas ($O_3$) and mixed oxidants including oxygen gas ($O_2$), peroxides, hydroxyl radicals, or the like. The contact between $H_2$ and $O_3$ has to be limited in order to enhance the production of $O_3$ in water and therefore enhance the water purification.

Thus, it has been discovered that the roughness of the surfaces of the anodes allows the production of a higher amount of ozone comparatively to smooth surfaces under the same voltage current.

Indeed, rough surfaces have a higher effective surface in contact with the water and allow the production of larger hydrogen bubbles by coalescence of the smaller hydrogen bubbles normally produced by smooth surfaces, and thus greatly reducing the reactivity surface between the hydrogen bubbles produced at the cathodes and the oxidants such as ozone.

It is therefore a first object of the present invention to provide a portable generator device for purifying water by producing ozone in situ. The device of the invention comprising:
  a housing;
  two electrodes, including an anode and a cathode that extend from the housing into the water and each have semi-rough or rough surfaces in contact with the water, the electrodes being separated by a first gap; and
  a power supply operatively connected to the electrodes for generating between them a difference of potential creating a current.

The two electrodes may be in the form of plate, perforated plate, rod, perforated rod, tube, perforated tube, wire, perforated wire, or mesh.

According to a first aspect of the invention, the two electrodes may be flat shaped and parallel to each other.

According to a second aspect of the invention, one of the two electrodes is an inner electrode (i) having a rod shape and the other of the two electrodes is an outer electrode (ii) having a tubular shape. The outer electrode (ii) surrounds the inner electrode (i) and has an inner and/or outer semi-rough or rough surface in contact with the water.

Preferably, the outer electrode (ii) comprises a plurality of holes. More preferably, these holes have rough edges.

According to the polarity of the electric connection, the inner electrode (i) may be the anode whereas the outer electrode (ii) may be the cathode. Inversely, the inner electrode (i) may be the cathode and the outer electrode (ii) may be the anode.

The device according to the present invention may optionally further comprise a third electrode extending from the housing into the water and having rough surfaces in contact with the water. This third electrode is separated from one of the two electrodes by a second gap. It has to be understood that this third electrode is an anode when placed close to the cathode or a cathode when placed close to the anode.

The device as described above in the preceding paragraph, may optionally further comprise a fourth electrode extending from the housing into the water and having rough surfaces in contact with the water. This fourth electrode is separated of one of the electrodes by a third gap. Here again, it has to be understood that this fourth electrode is an anode when placed close to one of the electrodes that is a cathode or a cathode when placed close to one of the electrodes that is an anode.

According to the first aspect of the invention mentioned above, the third and/or fourth electrodes are also flat shaped and parallel to the two electrodes and to each other.

According to the second aspect of the invention mentioned above, the third and/or fourth electrodes are tubular shape. The third electrode is placed surrounding the outer electrode. The fourth electrode is placed surrounding the third electrode.

The present invention is not limited to the number of electrodes used to produce ozone, and more than four electrodes may be used.

According to the second aspect of the invention, the surrounding tubular electrodes may contain a plurality of holes to allow the hydrogen bubbles to escape from the inside of the gaps and thus further limit the contact between $H_2$ and $O_3$. These holes may also have rough edges to favour the coalescence of the $H_2$ bubbles.

Consequently, the unwanted parasite reaction of the ozone with the hydrogen occurring between the electrodes is considerably reduced, leading to a higher production of ozone by using a lower voltage current and a very efficient purification of the water.

Anodes and cathodes of the ozone generator device according to the invention are preferably made of or plated with:
 activated or non-activated carbon fibres or nanotubes,
 metals or alloys of these metals selected from columns 3 to 13 (also named IB to VIIIB and IIIB) of the Periodic Table.

More preferably, the cathode is made or coated with a metal or a coating capable of absorbing hydrogen such as:
 metals or alloys from subgroups IIIB, IVB, VB, VIIB or VIII of the periodic table of elements, more preferably selected from, but not limited to, palladium, palladium alloys, magnesium alloys, and titanium alloys;
 special activated carbons, or
 other electrically conductive or $H_2$ absorbing materials known in the art.

Hydrogen ($H_2$) absorbing materials also participate to the diminution of $H_2$ in water and thus a higher concentration of ozone. Preferably, the electrodes will be in contact with a heating element which allows the absorbing element to regenerate. Another way to regenerate the absorbing element of the cathode is to invert for an adequate period of time the polarity of the connection with the power supply.

According to a preferred embodiment of the invention, the above mentioned second tubular electrode may act as a protecting shell for the inner (i) and the at least one outer electrodes (ii).

The above mentioned electrodes are made of metals, or plated with metals or alloys of these metals to create semi-rough or rough surfaces. Preferably, metals are semi-precious or precious metals.

The above mentioned housing of the portable generator device may incorporate or be linked the power supply via electric wires. The power supply may be a battery, a plurality of batteries or an electrical transformer supplied with external electricity. The power supply may also be at least one silicon solar panel, a turbine, or the like, fixed on the housing of the device or external to the device.

According to a preferred embodiment of the invention, the device may further comprise an ultra-sound generator device operatively connected to the power supply device. Ultra-sounds help to remove impurities, such as hardness or metal deposit, present on the surfaces of the electrodes after the device has been used for a while. Ultra-sounds also help produced oxidants, including ozone, to dissolve in water.

As aforesaid, the ozone produced in situ purifies the water and make it drinkable.

Therefore, a second object of the present invention concerns the use of the device as defined above for purifying water.

Preferably, the defined portable ozone generator is used for purifying water contained in a vessel such as a glass, a bottle, a jug or the like. The ozone generator may also be permanently installed into this vessel.

At least one portable ozone generator device according to the invention may also be adapted to be fixed to a tap producing the water to be purified. It or they also may be installed in one or a plurality of large tanks containing water.

At least one device may be also installed inside a filter-type housing which will allow water to flow in and out allowing treatment to occur on a continuous basis as opposed to batch.

A third object of the present invention concerns a method for purifying water comprising the steps of:
 a) plunging into water to be purified at least one portable generator device as defined above;
 b) turning on the power supply device; and
 c) waiting for an adequate period of time in order to let the at least one device producing ozone and purifying the water.

It has to be understood that the portable ozone generator device has a power, or strength. This power will depend on the configuration of the device, such as the size of the device, the number of electrodes, the nature of the electrodes, the voltage of the current, or the different gaps between the different electrodes.

Furthermore, different volume of water of different quality depending on the source of this water may be treated.

Consequently, the adequate period of time mentioned in step c) of the above defined method will be depending on the power or strength of the device, the volume and quality of water to purify.

Finally, the above mentioned method may be applied by using a plurality of devices according to the invention. These devices may be independent or connected to the same power supply device.

As aforesaid, the present invention is based on the discovery that the roughness of the surfaces of the electrodes leads to a coalescence of tiny hydrogen bubbles into larger hydrogen bubbles.

According to the second aspect of the invention, when the electrodes are perforated tubes with holes surrounding an inner rod electrode, the roughness of the edges of the holes also leads to a coalescence of tiny hydrogen bubbles into larger hydrogen bubbles. The presence of the holes in the tubular electrodes allows hydrogen bubbles to escape from inside the electrodes.

Finally, the different gaps between the different electrodes may be optimized as function of the difference of potential between the electrodes created by the current, in order to maximise the specific size of the hydrogen bubbles, and thus optimized the production of ozone in situ.

The present invention has the advantage to reduce the voltage of the current required to produce sufficient amounts of ozone and mixed oxidants in electrolytic cell, by creating larger hydrogen bubbles and thus greatly reducing the reactivity surface between the hydrogen bubbles and the oxidants. Therefore, the power supply used for powering the device may be as simple as a battery, a solar panel system or merely electricity using an electrical transformer, the device being then very handy and easy to use and transport, particularly in countries where water quality is poor and electricity supply difficult.

The present invention will be better understood upon reading the following non-restrictive description of a preferred embodiment thereof, made with reference to the accompanying drawings.

DETAILED DESCRIPTION OF THE INVENTION

As aforesaid, the present invention relates to a device for purifying water by producing ozone in situ, such a device being preferably handy and transportable.

Portable Ozone Generator with Plates Electrodes

Figure 1:
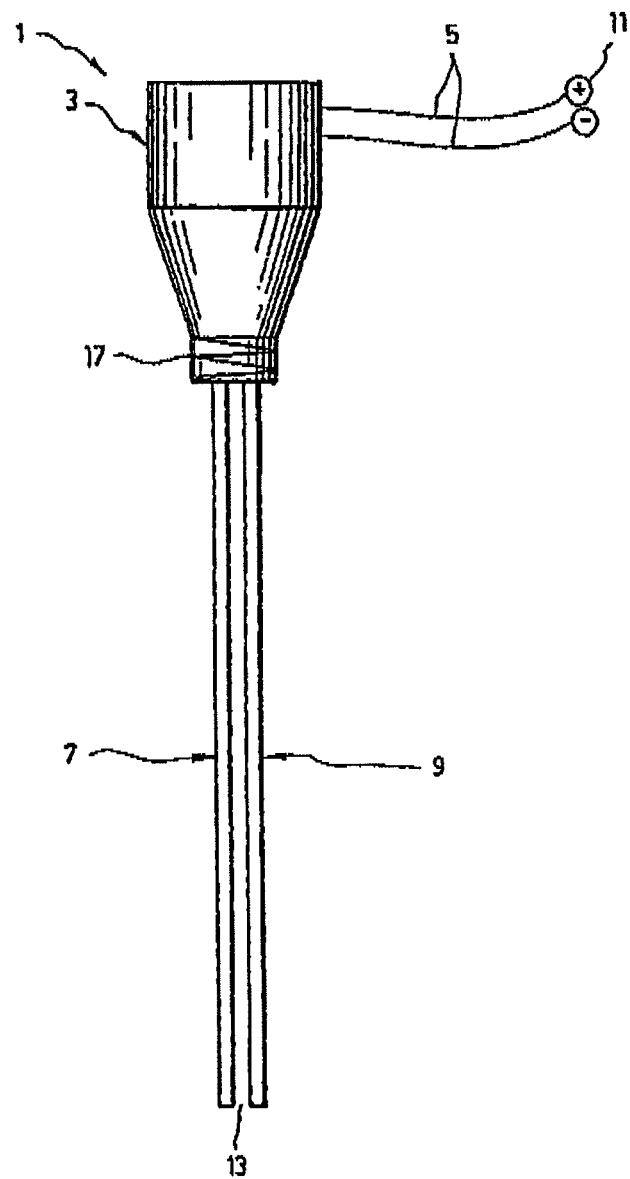
FIG. 1 is a lateral schematic view of a water purifying device according to a first aspect of the invention (plate electrodes).

According to a first aspect of the invention, as illustrated on FIG. 1, the device (1) may preferably comprise a housing (3) with electrical connexions (5) operatively connected to two electrodes (7 and 9). The electrodes extend from the housing into the water (not illustrated) and a power supply (11—also illustrated on the FIGURES by the usual symbols + and −).

The two electrodes (7, 9) are rod or flat shaped and parallel to each other. They are separated by a gap (13).

The flat shape of the two electrodes mentioned above is better visible on the FIG. 2, wherein the device illustrated on FIG. 1 has been adapted to be permanently installed into a bottle (15) containing water (18) to purify.

The bottom (19) of the bottle is connected to a hermetic compartment (21) containing the power supply (11). As illustrated on FIG. 2, the power supply may be a battery. It may also be a plurality of batteries, an electrical transformer or a silicon solar panel installed exteriorly on the bottle.

Figure 2:
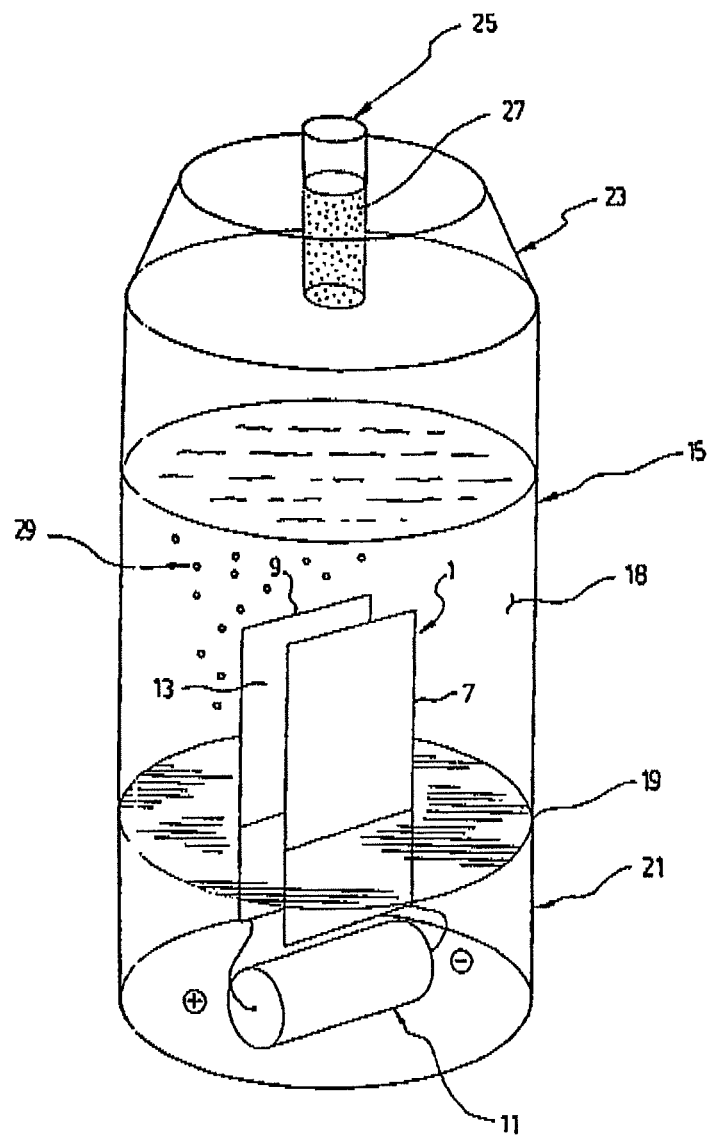
FIG. 2 is a three-dimensional view of a water purifying device according to the first aspect of the invention illustrated on FIG. 1 and permanently fixed into the bottle containing water.

As illustrated on FIG. 2, the bottle may also comprise a neck (23) including a drinking nipple (25). The drinking nipple may also comprise a filter (27) made of granular activated carbon, carbon block, membrane filter, resins or the like.

The power supply device (11) is operatively connected to the anode (7.—positive pole) and the cathode (9—negative pole) for generating between them a difference of potential creating a current. As aforesaid, it is well known in the art that water electrolysis that hydrogen gas ($H_2$) is created at the cathode (negative pole), and oxidants (oxygen, ozone, peroxides, hydroxides, etc) are created at the anode (positive pole).

The plate-type electrodes (7, 9) face each other to produce ozone and mixed oxidants in situ. Preferably, the electrodes are Pt mesh anodes and cathodes.

In the preferred embodiment illustrated on FIG. 2, the gap (13) between the two plate electrodes (7, 9) has been optimized to enhance the ozone production. Preferably, the gap between the electrodes is from about 1 to 5 mm, more preferably from about 2 to 3 mm. The data related to this preferred embodiment of the invention are presented in Example 1 hereinafter.

The term "about" mentioned in the present application generally corresponds to the precision of the tool used to measure the mentioned data. It may be limited to ±10% of the measure.

Figure 3:
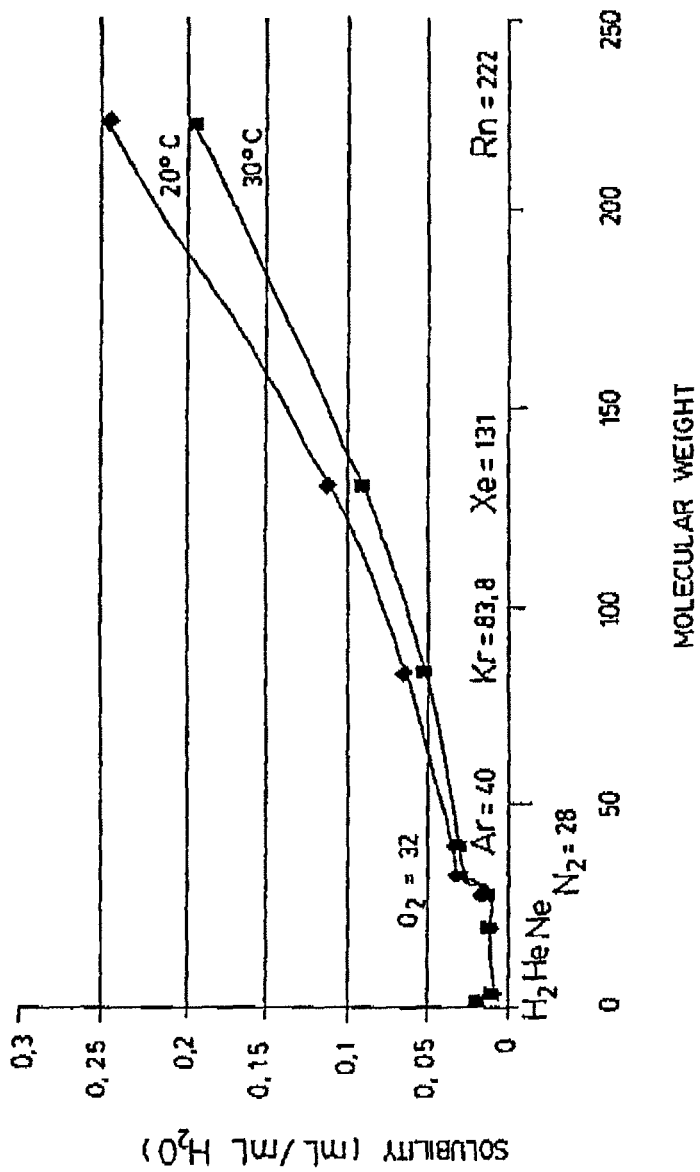
FIG. 3 (PRIOR ART) is a graphic representing the solubility of different gases in water for two different temperatures (20° C. squares and 30° C. triangles).
Figure 4:
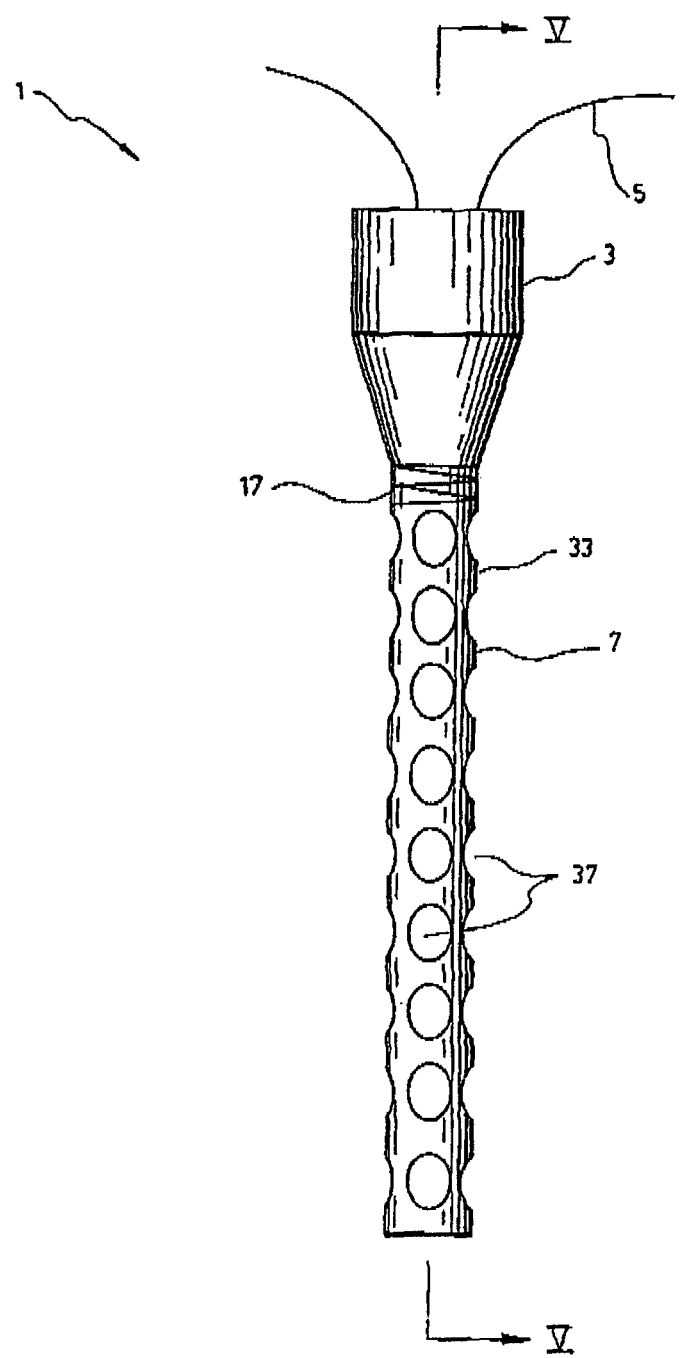
FIG. 4 a general schematic view of a water purifying device according to a second aspect of the invention (tubular electrodes).

As shown on the graphic represented on FIG. 3, the hydrogen solubility in water ($H_2$) in comparison with other gas (namely He, Ne, $O_2$, Ar, Kr, Xe or Rn) remains poor at temperatures ranging from 20° C. and 30° C. Consequently, the molecular hydrogen formed by the anode during the hydrolysis is a poor soluble gas which forms bubbles in water. The bubbles, which have different specific sizes, irremediably go up into the water to escape into the atmosphere.

The present invention first and foremost teaches us that in order to reduce the voltage required to produce sufficient amounts of ozone and mixed oxidants between the electrodes, the hydrogen gas should be removed by one or a combination of the following methods.

A) As aforesaid, the hydrogen formed as the cathode can be removed by using a cathode having semi-rough or rough surfaces to promote the coalescence of tiny hydrogen bubbles (29) into larger hydrogen bubbles. These larger hydrogen bubbles have a much smaller combined surface area than tiny hydrogen bubbles. Then, these larger hydrogen bubbles have orders of magnitude less reactivity with the ozone and mixed oxidants produced at the anode, even if intermixing occurs. In other words, these large bubbles will allow less parasite reaction between $H_2$ and $O_2$, $O_3$ or the other mixed oxidants like peroxides, or hydroxyl radicals present in the water.

Rough surfaces may be produced mechanically, by chemical etching, by rough plating, by dendrite plating or a combination of these processes.

B) Optionally, contact with hydrogen may be also reduced by using a membrane at the electrodes made of carbon fibres, textile carbon fibres, felt activated carbon, wire mesh or any media which is electrically conductive and create a maze of multiple fibres or porous media.

These membranes, which are not illustrated on the FIGURES of the present application, promote the formation of larger hydrogen bubbles and yield the benefits described above in part A).

Alternative materials which may be used include organo-metallic compound such as epoxy filled copper, gold, palladium, nickel or metal powders coated with platinum, gold, palladium or other separate or in combination. Also conductive polymers like aniline type polymers may be used.

C) The hydrogen formed at the cathode can also be removed by using hydrogen absorbing material for making or plating the electrodes, and more preferably the cathode. These materials may be:
- metals or alloys from subgroups IIIB, IVB, VB, VII, or IIIA of the periodic table of elements selected from, but not limited to palladium, palladium alloys, magnesium alloys, titanium alloys and aluminum;
- special activated carbons, or
- other electrically conductive or $H_2$ absorbing materials known in the art.

In this case, regeneration of the cathode may be required from time to time and may be accomplished by heating the cathode by flame or by an electrical resistance embedded or surrounding the cathode (17 on FIG. 1). Reversing the polarity on the electrodes will also yield the desired regeneration effect.

D) Finally, the hydrogen can be removed by reducing the gap between the electrodes, allowing less hydrogen to dissolve due to high $H_2$ water saturation in the small gap between the cathode and the anode and will make $H_2$ gas to escape without reacting with mixed dissolved oxidants. The gap is optimized as function of voltage, current and flow through peripheral holes of the cathode to maximize dissolved $O_2$, $O_3$ and mix oxidants content in the water. As aforesaid, it is well known that $H_2$ is much less soluble in water than $O_2$, $O_3$ or mixed oxidants (See FIG. 3).

E) This final point will be illustrated on FIGS. 8 to 13, wherein the hydrogen can further be removed by using a second electrode (55) outside the reactor (33) to attract the hydrogen (57) produced further away from the reactor where the ozone and mixed oxidants are produced. This second electrode may be preferably an anode. As illustrated on FIGS. 8 to 13, this outside electrode (55) may have also the purpose to tank the water and to protect the device (1)

The inventors of the present patent application have perfected the present invention by creating another configuration for the electrodes, such configuration leading to a sixth point F) of reduction of hydrogen in water.

Portable Ozone Generator with Rod and Tubular Electrodes

According to a second aspect of the invention, illustrated on FIGS. 4 to 13, the portable ozone generator device may have the form and size of a pen. That is why the device has been named OZOPEN by the inventor.

The device (1) comprises an inner electrode (31—visible on FIG. 5) having a rod shape and extending from the housing (3) into the water. The inner electrode (31) is surrounded by an outer electrode (33) which has a tubular shape, extending from the housing (3) into the water. The inner and outer electrodes are separated by a gap (35). Inner and outer electrodes may form what it may be may called a reactor.

As aforesaid, creating a small gap between the anode and cathode allows for more efficient electrolytic production of ozone and mixed oxidants at lower voltages and energy consumption.

The surface of the inner electrode (31) has been made rough. The inside and outside surfaces of the tubular outer electrodes (33) have been also made rough. The purpose of this roughness has been detailed in method A) above.

Comparatively to the flat plate shape configuration presented in part □ above, the tubular shape of the electrodes does not allow the hydrogen bubbles formed inside the reactor to escape when the device is placed in the water with the housing on top. That is why, the following method F) for limiting the hydrogen inside the reactor has been thought by the inventors. As illustrated in FIGS. 4 to 13, the outer electrode has a plurality of holes (37) which allow hydrogen to escape from inside the reactor thereby reducing its scavenging effect on the ozone and mixed oxidants produced.

The holes (37) may range from a few millimetres to a few centimetres in diameter depending on total length of the unit. The number of holes will also depend on the size of the reactor.

Furthermore, the edges of the holes have also made rough.

It has to be understood that the roughness of the surfaces of the electrodes and the roughness of the edges of the holes also lead to a coalescence of tiny hydrogen bubbles into larger hydrogen bubbles (method A).

Furthermore, the presence of the holes of the outer electrode allows hydrogen to escape from inside the reactor when the reactor is under the housing in the water, and thus reduces the possibility of contact between hydrogen and oxidants, particularly the ozone.

Finally, the gap (35) between the electrodes is optimized as function of the difference of potential between the electrodes, to maximise the size of the hydrogen bubbles.

Experiments conducted in the inventors' laboratory and presented in Example 2 have shown that high concentrations of ozone can be achieved based on these principles reaching in some cases 1 ppm (part per million) after 1 minute in 1 L of water using a 24 VDC voltage and 1 ADC amperage. As also presented in Example 2, a 1.5 ppm concentration of $O_3$ can be reached after 6 minutes of using of the purifier in 250 ml of water using a 18 VDC voltage such as a voltage produced by two standard 9V batteries connected in series providing a few milliamps of current.

The device according to the invention may be powered by a DC power supply, batteries, solar power, small turbine, heated thermopile, activated by air or water flow, or other.

As aforesaid, the inner electrode (31) may be also made semi-rough or rough. Preferably, the inner electrode presents micro-roughness on its surface, which increases the effective contact surface of the electrode with water. When the inner surface is an anode, the roughness increases the production of oxidants, particularly ozone.

The purifier may preferably have an anode of pure or plated platinum (Pt), palladium (Pd), or gold (Au) with smooth or rough plating, or dendritic plating. The anode may also be in the form of a rod, a wire, a mesh or other form.

Figure 6:
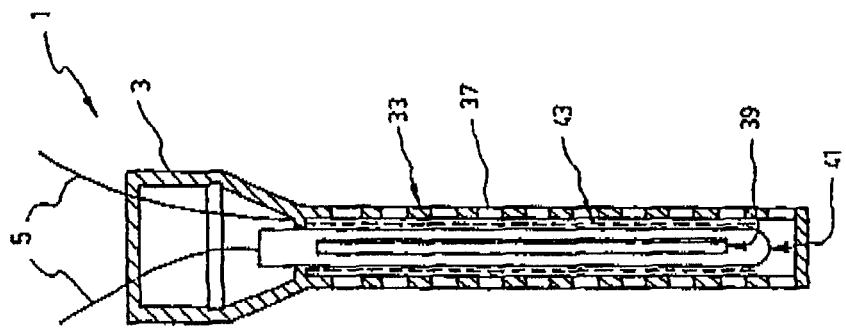
FIG. 6 is a longitudinal cross-sectional view of the water purifying device illustrated on FIG. 4 according to a second preferred embodiment of the invention.
Figure 5:
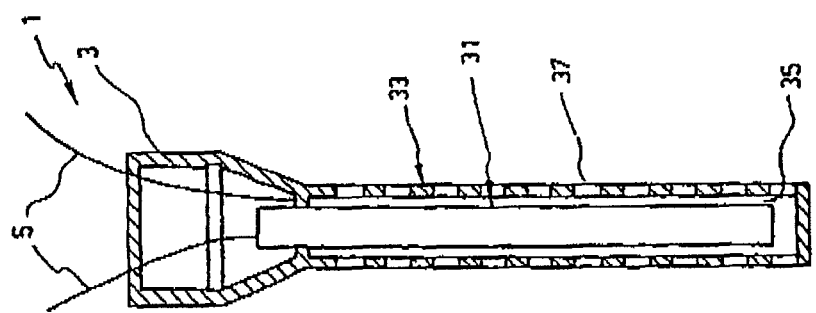
FIG. 5 is a longitudinal cross-sectional view of the water purifying device illustrated on FIG. 4 according to a first preferred embodiment of the invention.

According to the preferred embodiment of the invention illustrated on FIG. 6, the device according to the present invention may also house a lamp (39) producing light with a wavelength from about 1 nm (far ultra-violet light) to about 580 nm (green light), in order to aid in the production of ozone or hydroxyl radicals and to kill micro-organisms such as bacteria and viruses. The lamp (39) is preferably surrounded by a transparent quartz or glass vessel (41) such as a tube, itself surrounded by a perforated tubular shaped anode (43).

Figure 7:
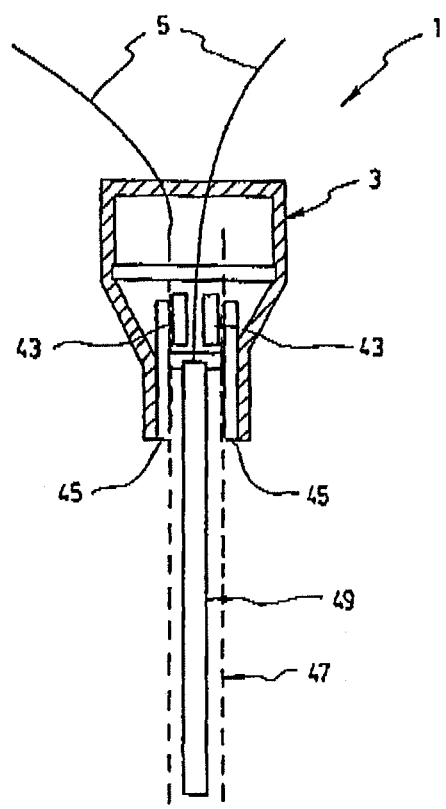
FIG. 7 is a longitudinal cross-sectional view of the water purifying device illustrated on FIG. 4 according to a third preferred embodiment of the invention.

As illustrated on FIG. 7, lamps (43) may also be introduced into the housing (3) of the device (1). Preferably, the lamps used to produce light are LEDs (Light Emitting Diodes).

The light is thus introduced into the reactor via connected fibre optics or transparent glass or quartz rods or tubes (45). The fibre optics or transparent glass (45) may be surrounded by light absorbing material (not illustrated), such as Lexan®.

According to the preferred embodiment illustrated on FIG. 7, the perforated anode (47) surrounds the inner cathode (49). In this particular case, the hydrogen being produced at the inner cathode (49), water may be manually or mechanically stirred to increase contact time and ensure good distribution of ozone and mixed oxidants in water. By manually stirring, it has to be understood that the user can simply agitate the purifier into the glass of water to enhance the purification process.

The portable ozone generator according to the present invention may be a few centimetres to several meters long depending on the volume of water to be treated. In order to be easily transportable, the device may be preferably of the size of a pen.

According to another embodiment of the present invention which is not illustrated on the FIGURES, the anode can be connected to a piezoelectric crystal actuated at a sufficient frequency to create pressure shock waves thereby enhancing the solubility of oxygen, ozone and mixed oxidants in water.

The purifier according to the present invention can also be installed in a way to increase the pressure thereby enhancing the solubility of oxygen, ozone and mixed oxidants in water. Large hydrogen bubbles will be reduced in size due to the higher pressure but will remain large enough to reduce the solubility of hydrogen at high pressure.

All of the above may be installed in a reverse fashion where the anode is found outside and the cathode is found at the center of the device (See FIG. 7).

Another preferred embodiment of the present invention would consist of several layers of anodes and cathodes to increase the total surface area and thus maximizing ozone and mixed oxidant production.

The Ozone Generator Device Installed to a Faucet

As illustrated in FIGS. 8 to 13, the device for purifying water according to the present invention may be easily installed directly or indirectly at the end of a tap or a faucet, in order to purify the water going out from it.

Figure 10:
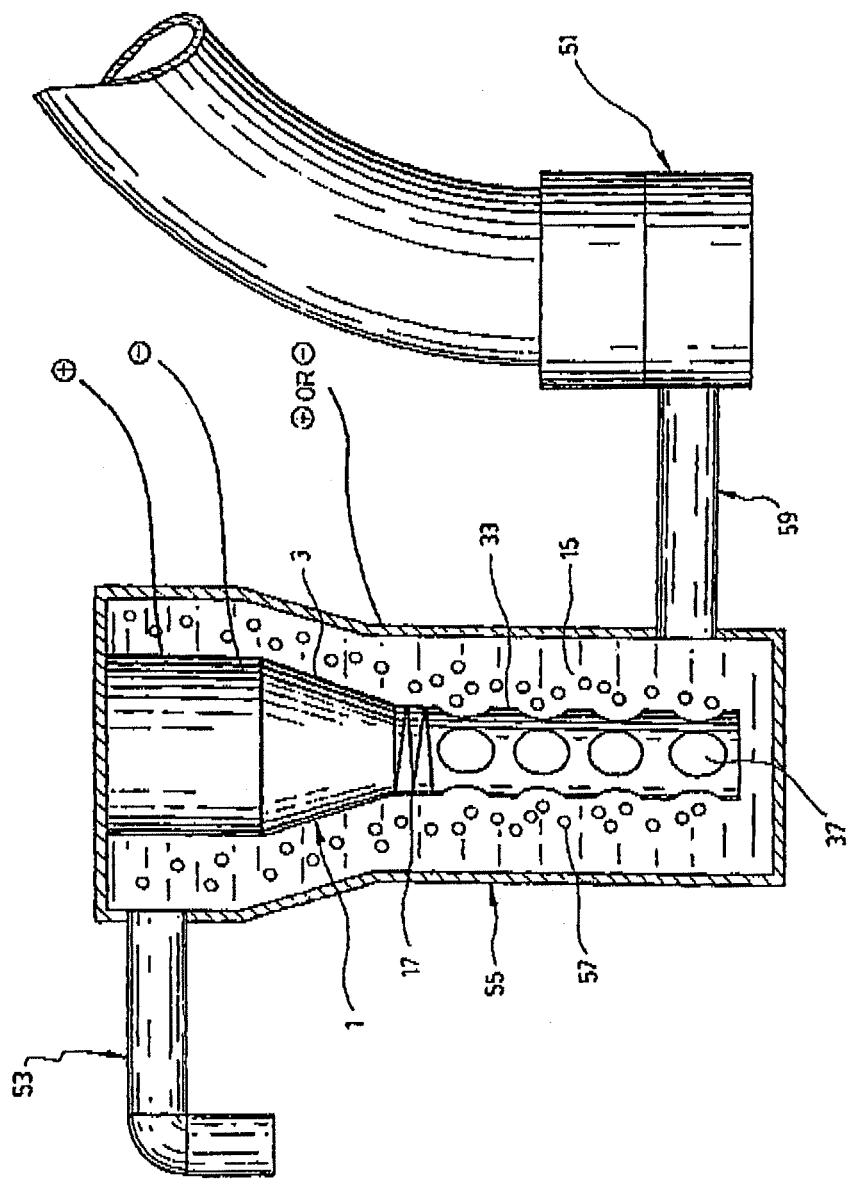
Figure 11:
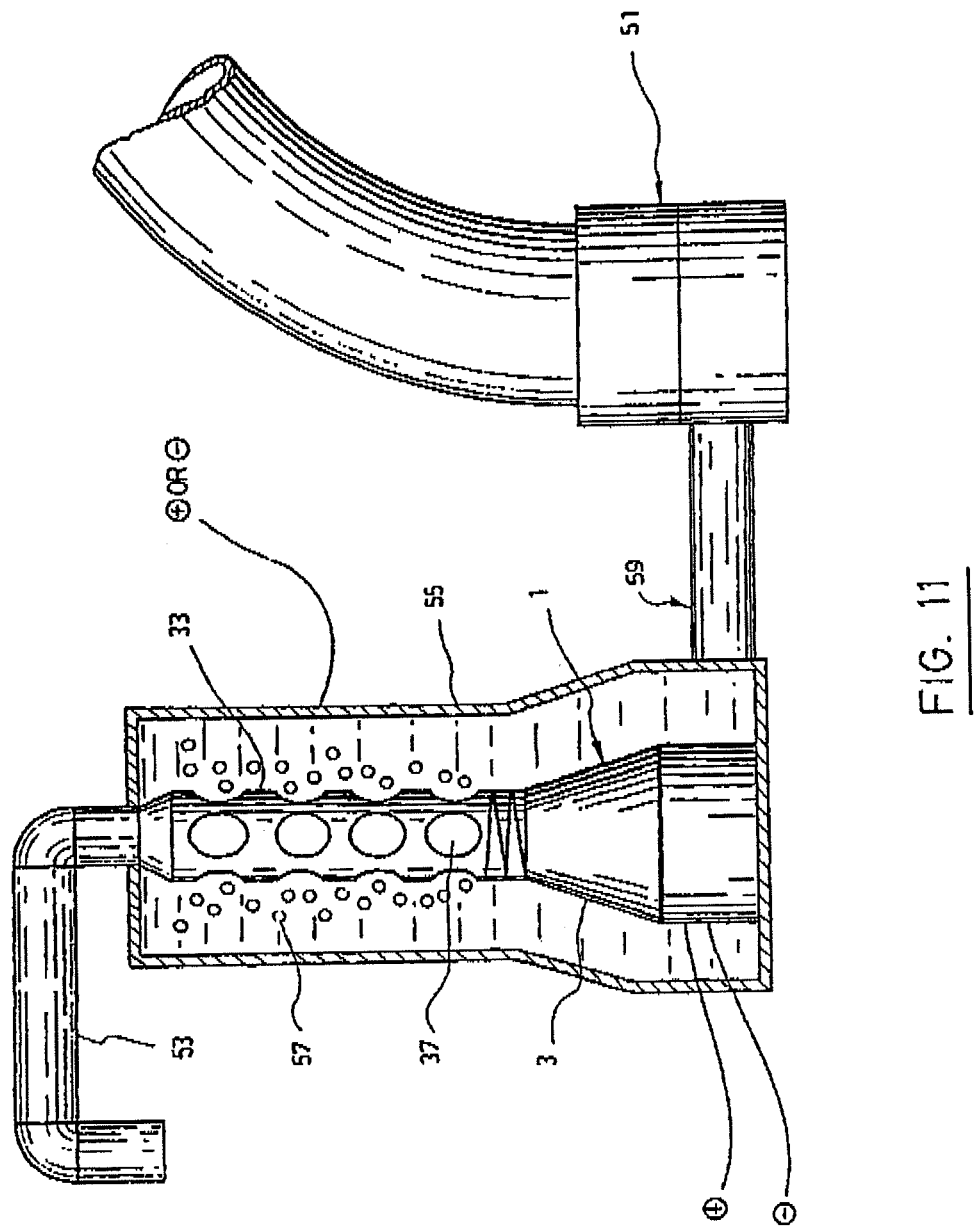
Figure 12:
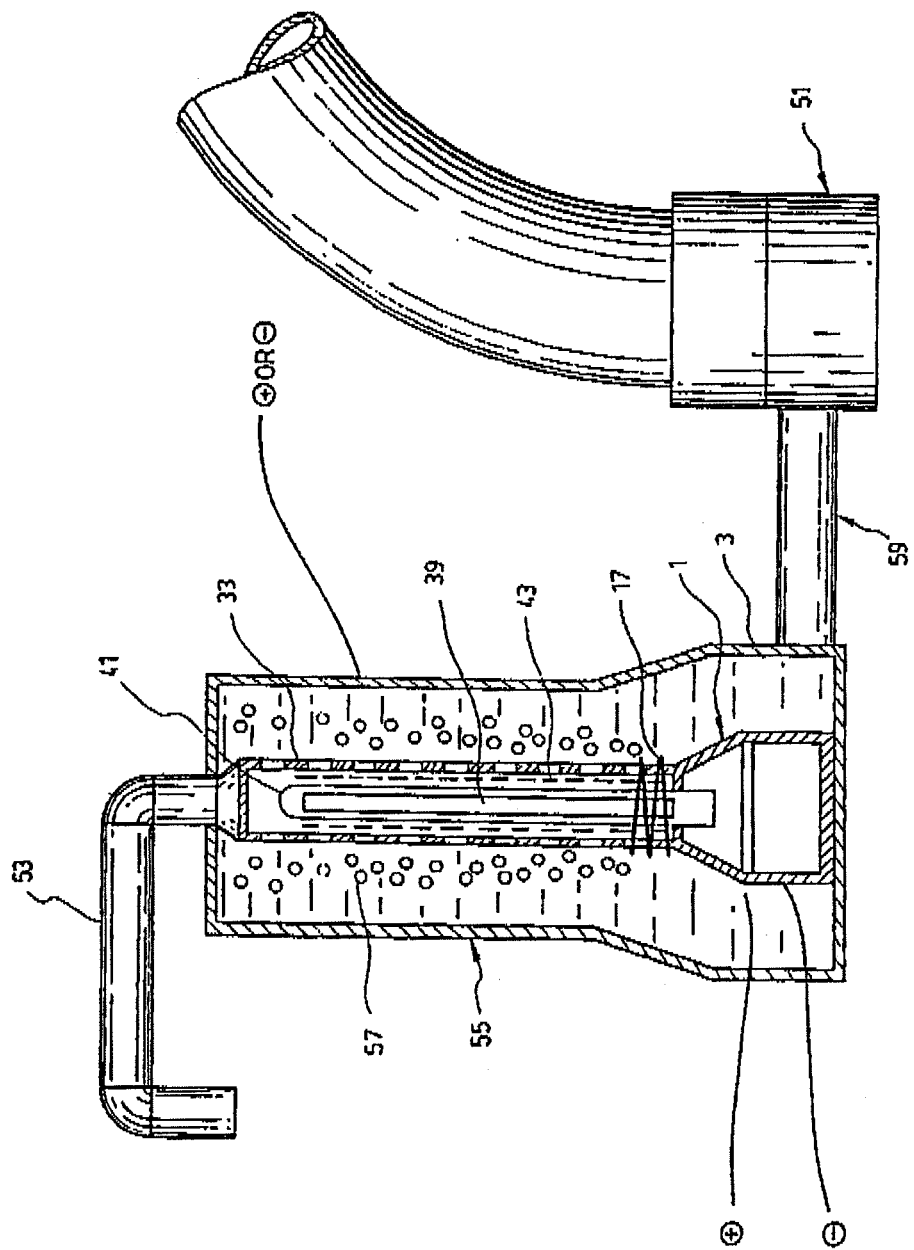
FIG. 12 is a longitudinal cross-sectional view of the device as illustrated on FIG. 6 and fixed to the tape.
Figure 13:
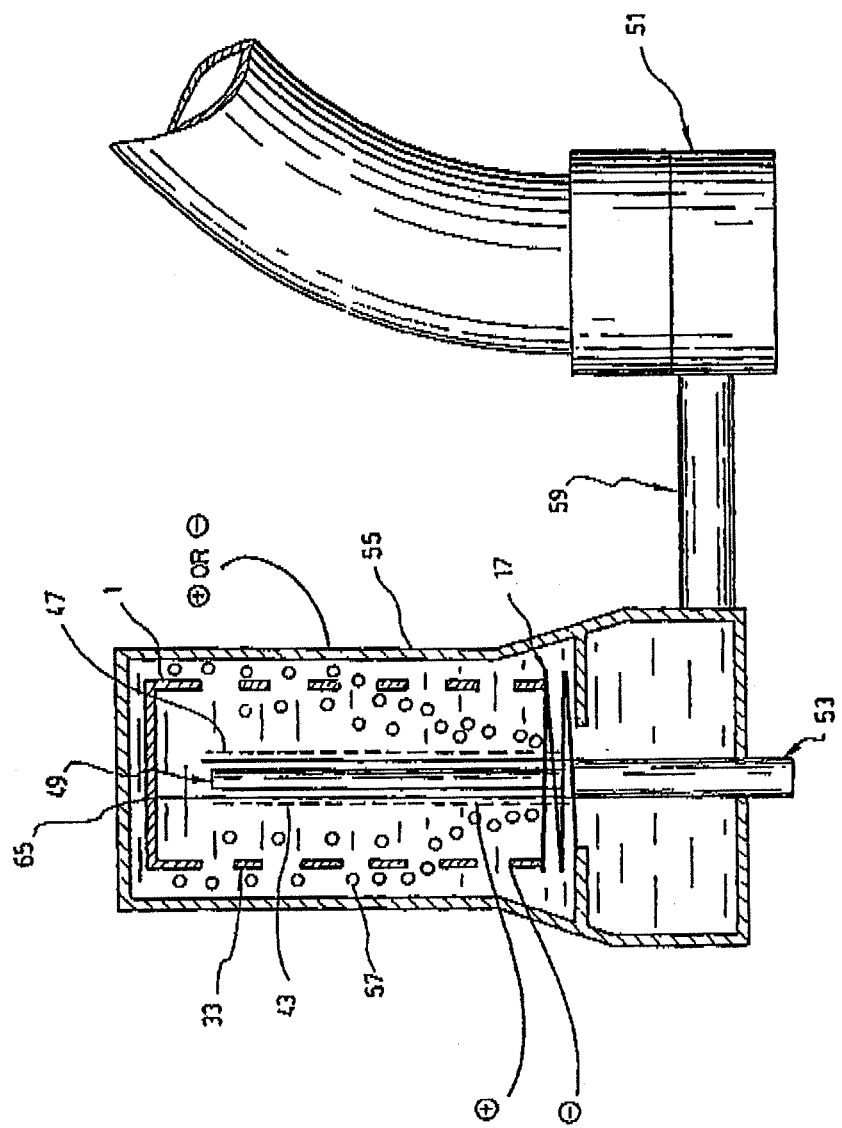
FIG. 13 is a longitudinal cross-sectional view of the device as illustrated in FIG. 7 and fixed to a tap.

The device (1) is fitted to a faucet (51). The electrical housing (3) is connected to a power supply (not illustrated) and to the electrodes. The outer electrode (33) plays the role of a reactor in which the water is purified. A heating element (17) can be installed at the top of the electrodes. A tube (53) is fixed at the bottom of the reactor (33) bringing the purified water outside the purifier (FIGS. 8, 9 and 13) or at the top of the reactor (FIGS. 10 to 12).

The device (1) is surrounded by a second full pipe electrode (55) in order to enhance the elimination of $H_2$. Hydrogen bubbles (57) travel from inside the reactor (33) towards the second full pipe electrode (55), leading to a diminution of $H_2$ concentration inside the reactor where the ozone is produced. This second electrode (55) also plays the role of protecting shell to the electrodes.

Figure 8:
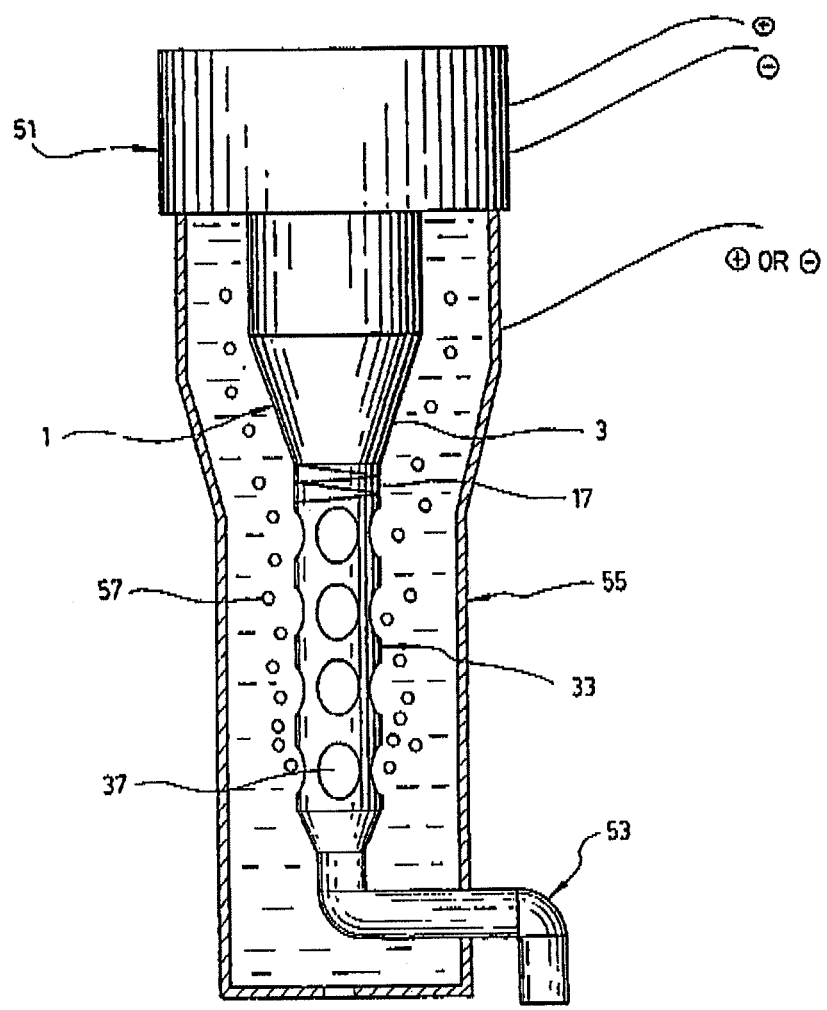
FIGS. 8 to 11 are general schematic views of the water purifying device of the invention as illustrated on FIG. 4, adapted to be fixed to a tap under different configurations.

As illustrated on FIG. 8, water may exit directly from the inner chamber of the reactor (33) via an outlet tube (53) where ozone rich water is produced and separated from the hydrogen rich water flowing in the space found between reactor (33) and outer housing (55). In this configuration, hydrogen rich water preferably exits at the bottom of the housing (55) and is discarded to the drain (not shown). Although for the purpose of purification, it is preferable to separate the ozone rich water from the hydrogen laden water in such a manner, this also results in a loss of some water flow. In cases where such a loss is undesirable both the ozone rich and hydrogen rich water may be discharged through the same exit (FIGS. 9 to 13).

As illustrated on FIGS. 10 to 13, the second electrode (55) plays the role of a water tank. This tank is connected is connected to the faucet (51) via an inlet pipe (59) which brings the water into the tank containing the device (1).

Figure 9:
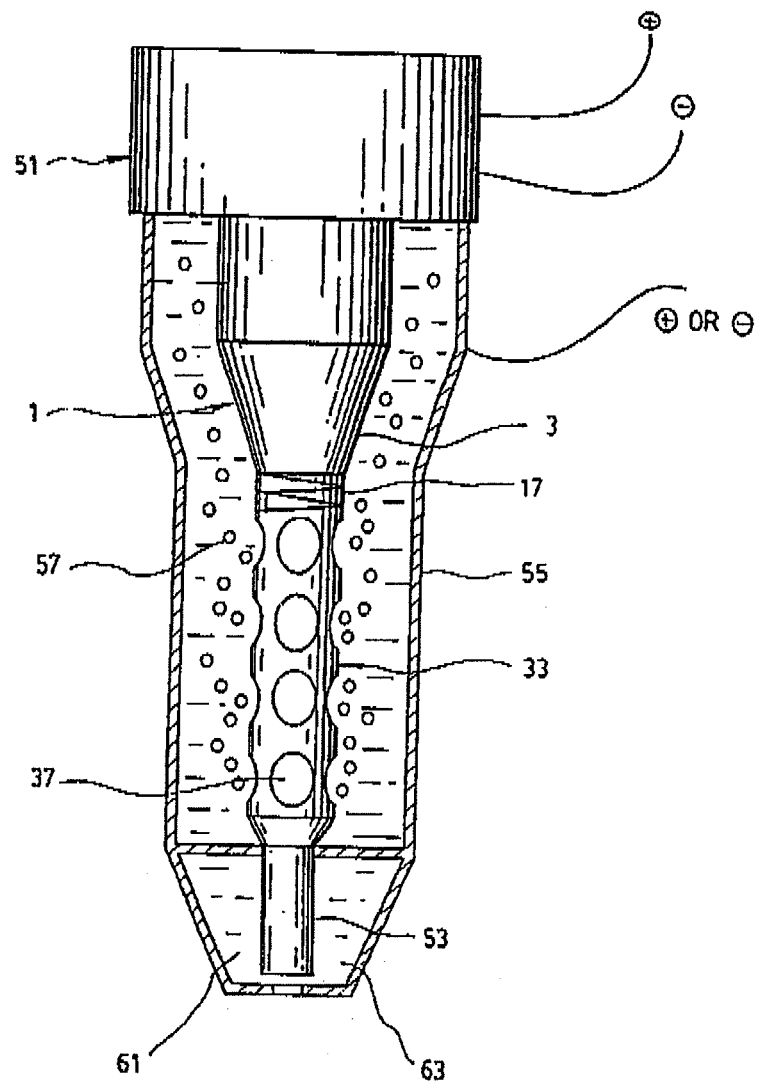

As illustrated on FIG. 9, the bottom of the second electrode (55) may be also connected to a reservoir (61). Preferably this reservoir contains a filter (63) to enhance the water purification by removing from it solid organic or mineral particles. The filter may be also installed inside the exit tube (53) and made of granular activated carbon, carbon block, membrane filter, resins or the like.

Where the device has a small size, such as the size of a pen, it can be easily transported in a baggage and installed anywhere needed, for example on the tap of a hotel room if the user believes that the water may contain batteries and germs. The same principles of design may be applied to the purification of water coming from artesian wells public fountains such as found in rural Africa.

The device may be installed in any direction in accordance with the direction of the water inlet or faucet.

Although the present invention has been explained hereinabove by way of a preferred embodiment thereof, it should be pointed out that any modifications to this preferred embodiment within the scope of the appended claims is not deemed to alter or change the nature and scope of the present invention.

EXAMPLES

Example 1

The following example is illustrated on FIG. 2 wherein two plate-type electrodes facing each other are installed into a bottle. The dimensions of the electrodes are 3.5 cm×4.0 cm each. The gap between the electrodes is from 2 to 3 mm. The electrodes are fixed to the bottom of a bottle, the bottom being fixed to a compartment containing three batteries with a voltage of 9 V each.

The bottle contains 500 ml of water with a TDS of 469 ppm.

TDS means "Total Dissolved Solids". By "Dissolved solids", it has to be understood any minerals, salts, metals, cations or anions dissolved in water. This includes anything present in water other than the pure water ($H_2O$) molecule and suspended solids. Suspended solids are any particles/substances that are neither dissolved nor settled in the water, such as wood pulp. In general, the total dissolved solids concentration is the sum of the cations (positively charged) and anions (negatively charged) ions in the water.

After 1 minute, the ozone ($O_3$) concentration in the water is about 0.55 ppm.

After only 5 minutes, the $O_3$ concentration is about 1.1 ppm, which is enough to purify the water in the bottle.

The measurement of $O_3$ concentration is made with a HACH DPD $O_3$ test kit.

Example 2

Bacteriologic tests have been performed to demonstrate that the portable ozone generator for purifying water is effective to eliminate bacteria and coliforms and to make the water drinkable.

Device Description

The portable ozone generator for purifying water used in the following test is a preferred embodiment of the present invention, and is named hereinafter "OZOPEN". The OZOPEN used is operated by two 9V batteries for a total of 18V and has the following characteristics:

an inner anode in Pt plated mesh an outer cathode in Pt plated mesh.

an external aluminum body is placed close to the cathode, this outer body having roughened holes for helping the coalescing of hydrogen bubbles produced at the cathode and helping the hydrogen bubbles to escape out of the OZOPEN.

The OZOPEN used here has no heating element.

The Table 1 below presents the performance of the OZOPEN used, which corresponds to the concentration of ozone produced by the OZOPEN in function of the time (minutes) in a 250 mL sample of bottle water having a TDS of 450 ppm.

TABLE 1

| TIME (MINUTES) | OZONE CONCENTRATION (PPM) |
| --- | --- |
| 0.5 | 0.2 |
| 1 | 0.3 |
| 2 | 0.45 |
| 4 | 0.8 |
| 6 | 1.5 |

Waters Description

Different types of water have been tested:

i) Septic water: The septic water used in this study originates from a domestic waste source. 1 L of this water was collected and used as the raw water for all trials conducted in this study. This was done to ensure consistency in the results.

ii) Commercial Water: Commercial bottled water was used as a control for the bacteriological and coliform analysis. Pure Life® from the society Nestle (Serial Number: 012707 7027WF0004, 2120BESTBY01/2009)

Bacteria and Coliform Test Kits

Commercial test kits were used during this study to control the efficiency of the OZOPEN.

i) Bacteria test strips: SaniCheck® by BioSan Laboratories Inc.

Parameter Tested: Total Aerobic Bacteria.

Indication: If pink/red dots appear on test strip after a 24-36 hour incubation period, then the sample contains aerobic bacteria.

ii) Coliform Test: Water Check® by Rainfresh Water Filters.

Parameter Tested Coliforms Including *E. Coli*

Indication: The sample contains coliforms. The greenish/blue color of the sample indicates the presence of coliforms in the sample after a 60 hour incubation period.

Test Procedure

Test 1: The sample is a 250 mL solution of septic water placed in a glass beaker. The sample was ozonated for 1 minute using OZOPEN. Sample was tested for bacteria and coliforms as per test kit instructions.

Test 2: The sample is a 250 ml of septic water was placed in a glass beaker. The sample has been ozonated for 5 minutes and then tested for bacteria and coliforms as per test kit instructions. It has to be noted that TDS level of septic water was 450 ppm.

Results:

TABLE 2

| | TEST | |
| --- | --- | --- |
| SAMPLE | AEROBIC BACTERIA PRESENT | COLIFORMS PRESENT |
| Bottled water (reference) | No | No |
| Septic water | Yes | Yes |
| Ozonation 1 min. | Yes | No |
| Ozonation 5 min. | No | No |

When the ozonated sample is compared to the bottled water sample, the test shows that after 1 minute of Ozonation, the OZOPEN is able to completely eliminate coliforms from septic water. However, it can be seen that some aerobic bacteria remain. After 5 minutes of Ozonation, both coliforms and bacteria have been eliminated, making the 250 mL septic water sample drinkable.

In conclusion, these tests show that the OZOPEN can eliminate bacteria and coliforms.

What is claimed is:

1. A portable ozone generator device for purifying water by producing ozone in situ, the device including:

a housing;

a rod-shaped inner electrode connected to the housing;

a tubular-shaped outer electrode connected to the housing and positioned around the inner electrode, the inner and outer electrodes being spaced-apart from one another by a gap filled with some of the water to be purified when the electrodes are immersed therein;

a power supply operatively connected to the electrodes to generate between them a difference of potential creating a current when the electrodes are immersed in the water, the current transforming one of the electrodes into a cathode that produces hydrogen gas bubbles in the water, and transforming the other electrode into an anode that produces mixed oxidants in the water, the mixed oxidants including the ozone in the form of ozone gas bubbles;

wherein the outer electrode includes a plurality of spaced-apart holes and the outer electrode has a non-smooth outer surface between the spaced-apart holes, the outer surface of the outer electrode being intentionally made non-smooth by chemical etching to promote a coalescence of the hydrogen gas bubbles into larger hydrogen gas bubbles on the outer surface when the outer electrode is used as a cathode, thereby reducing a reactivity surface between the hydrogen gas bubbles and the ozone gas bubbles so as to increase an amount of the ozone produced in situ for treating the water and wherein edges surrounding at least some of the holes on the outer electrode have a non-smooth surface for promoting the coalescence of the hydrogen gas bubbles into larger hydrogen gas bubbles.

2. The device according to claim 1, wherein said inner electrode is the anode and said outer electrode is the cathode.

3. The device according to claim 1, wherein the cathode or the anode is made of or is plated with metals or alloys of said metals selected from columns 3 to 13 of the Periodic Table.

4. The device according to claim 1, wherein said cathode is made of or is plated with palladium, palladium alloys, magnesium alloys, or titanium alloys, wherein the cathode has a property of absorbing the hydrogen produced by the cathode.

5. The device according to claim 1, wherein said power supply is an external power supply connected to said electrodes using electric wires, or wherein said housing incorporates said power supply.

6. The device according to claim 1, wherein said power supply includes at least one battery.

7. The device according to claim 1, further including an ultrasound generator device operatively connected to the power supply device, wherein the ultrasound generator device produces ultra-sounds in order to remove impurities present on the surfaces of the electrodes and to help said mixed oxidants to dissolve in water.

8. A method for purifying water including the steps of:
 a) plunging into the water to be purified the portable ozone generator device as defined in claim 1;
 b) creating the current between the electrodes; and
 c) waiting for an adequate period of time in order to let said device produce enough ozone to purify the water.

9. The method according to claim 8, wherein the water to be purified has a volume and a quality, and wherein said adequate period of time varies according to said current and said volume and/or quality of the water to purify.

10. The method according to claim 8, further including the step of:
 stirring the device to promote a distribution of the ozone produced in situ.

* * * * *